Figure 1:
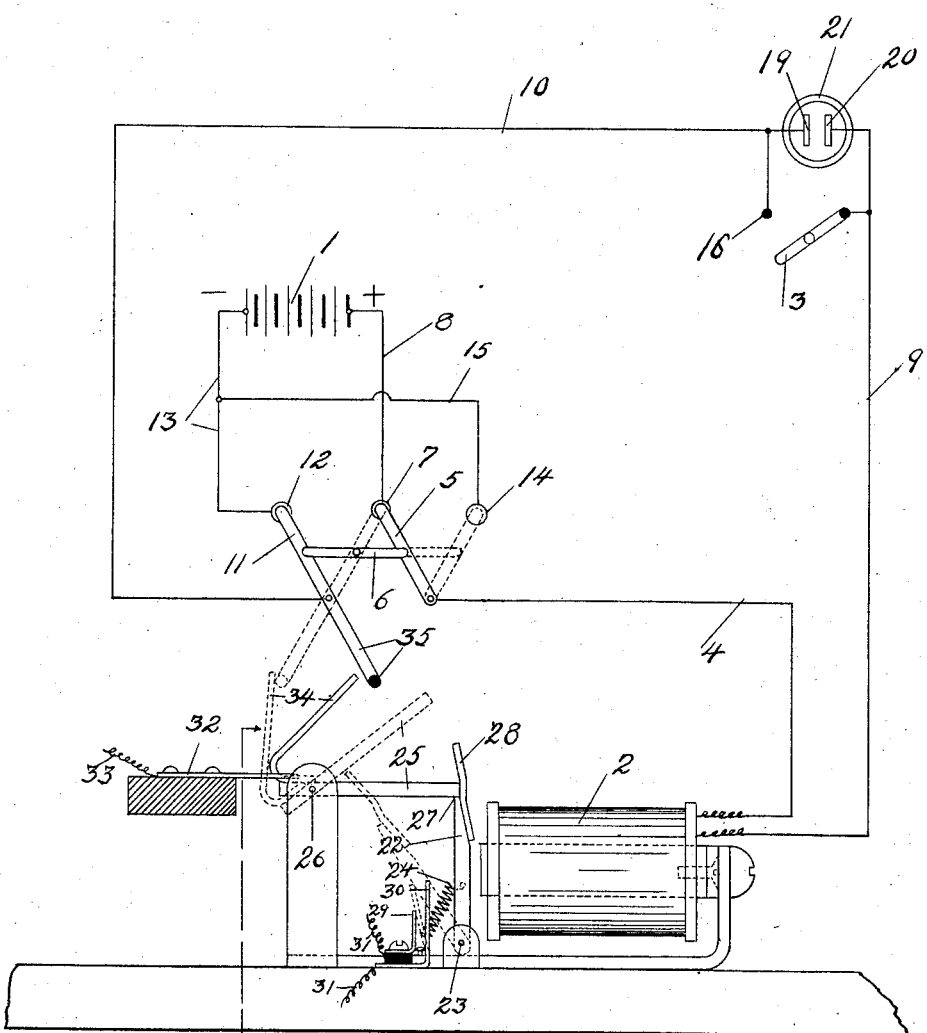

No. 859,598. PATENTED JULY 9, 1907.
J. DORAN, Jr.
ELECTRIC SIGNALING AND TESTING MECHANISM.
APPLICATION FILED JUNE 28, 1906.

2 SHEETS—SHEET 1.

WITNESSES
INVENTOR

No. 859,598.

PATENTED JULY 9, 1907.

J. DORAN, Jr.

ELECTRIC SIGNALING AND TESTING MECHANISM.

APPLICATION FILED JUNE 28, 1906.

2 SHEETS—SHEET 2.

UNITED STATES PATENT OFFICE.

JOHN DORAN, JR., OF SCHENECTADY, NEW YORK.

ELECTRIC SIGNALING AND TESTING MECHANISM.

No. 859,598.  Specification of Letters Patent.  Patented July 9, 1907.

Application filed June 28, 1906. Serial No. 323,909.

*To all whom it may concern:*

Be it known that I, JOHN DORAN, Jr., a citizen of the United States, residing at Schenectady, county of Schenectady, and State of New York, have invented certain new and useful Improvements in Electric Signaling and Testing Mechanisms, of which the following is a specification.

The invention relates to such improvements and consists of the novel construction and combination of parts hereinafter described and subsequently claimed.

Reference may be had to the accompanying drawings, and the reference characters marked thereon, which form a part of this specification.

Similar characters refer to similar parts in the several figures therein.

Figure 2:
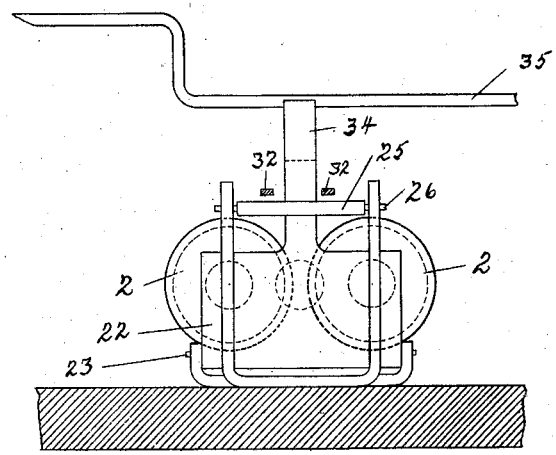
Figure 3:
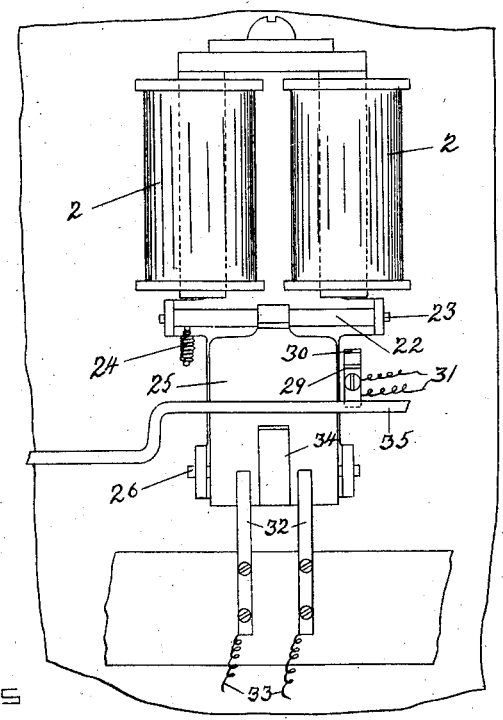

Figure 1 of the drawings is a view partly diagrammatic and partly in side elevation showing my improved signaling and testing mechanism incorporated in a fire-alarm system or the like. Fig. 2 is an end elevation of the signaling and testing mechanism viewed in the direction of the arrow in Fig. 1. Fig. 3 is a top plan view of the same.

My invention relates to signaling and testing mechanism for use in an open-circuit electric signaling and testing system having incorporated in the circuit a rectifying electrolytic cell, that is, a cell resistant to the passage of an electric current in one direction and non-resistant to the passage of an electric current in the opposite direction.

No claim is made herein broadly to the system just referred to and which will be hereinafter more particularly described, the same forming the subject of Letters Patent of the United States No. 826,090, granted to me July 17, 1906, for electric signaling and testing systems.

The present invention relates more particularly to the mechanism whereby, when the wires on opposite sides of said cell are connected together through a signal-switch while they are in circuit with a source of electrical energy the direction of whose current is such as to render said cell resistant, the desired signal will be given; while, when the direction of said current is reversed with the signal-switch open, a break in said circuit will be properly indicated.

Referring to the drawings wherein the invention is shown in preferred form, 1, represents a source of electrical energy, as an ordinary battery, and, 2, an electro-magnet normally in circuit with said battery when the signal-switch, 3, is closed, said circuit being formed in part by a conductor, 4, connecting one end of the coil of the magnet with a lever, 5, of a pole-changing switch, 6, said lever, 5, being normally in contact with a switch-terminal, 7, connected by wire, 8, with the positive pole of said battery, and in part by a conductor, 9, connecting the other end of the coil of said magnet with an aluminium electrode, 20, of a rectifying cell, 21, and a wire, 10, connecting the carbon electrode, 19, of said cell with the lever, 11, of said pole-changing switch which is normally in contact with a switch-terminal, 12, connected by wire, 13, with the negative pole of said battery.

A third switch-terminal, 14, of said pole-changing switch is connected by wire, 15, with the wire, 13, and thereby with the negative pole of the battery.

The lever of the signal-switch, 3, is connected with the wire, 9, and is adapted to make contact with the switch terminal 16, connected with the wire, 10, said signal-switch lever and said terminal, 16, being located on opposite sides of the cell, 21.

The cell, 21, may be any known form of rectifying cell, that shown comprising electrodes of aluminium and carbon in a suitable electrolyte, which cell offers but slight resistance to an electric current entering at the carbon and leaving at the aluminium but which offers a very marked resistance so as to practically interrupt the flow of current when the current is reversed so as to enter at the aluminium.

With the levers 5 and 11, of the pole-changing switch in contact with the respective terminals, 7 and 12, it will be seen that on account of the resistance of the cell, 21, no current will pass through the coil of the magnet so long as the signal-switch, 3, remains open, and that when said signal-switch, 3, is closed, a current will flow through the coil of the magnet thus causing energization of the magnet which enables me to make use of the same for signaling purposes, as will be hereinafter more fully set forth.

When the pole-changing switch is reversed to the position indicated by dotted lines in Fig. 1, with its levers, 5 and 11, in contact with the respective switch-terminals, 14 and 7, a reverse current, to which the cell, 21, is non-resistant, will, though the signal switch, 3, be open, pass through the coil of the magnet, causing energization of the magnet which enables me to make use of the same for testing purposes as will be hereinafter more fully set forth.

The mechanism whereby the electro-magnet is utilized, both for testing purposes and for signaling purposes, is as follows:—

The armature, 22, of the magnet is pivotally mounted at, 23, and is connected by a coil-spring, 24, with a fixed support whereby said spring tends to pull said armature away from the magnet. The armature is normally retained in upright position by means of a lever, 25, pivoted at, 26, upon a fixed support, one end of said lever being adapted to normally rest upon a ledge, 27, formed on the armature and being located in the path of a finger, 28, fixed upon the armature and inclined so as to overhang the abutting end of the lever 25.

When the lever, 25, is moved from the position shown by solid lines to that indicated by dotted lines in Fig. 1, the armature, 22, is first forced inwardly into close proximity to the magnet-core by the engagement of the abutting end of the lever with the inclined finger, 28, immediately after which the lever, 25, passes beyond and away from said finger, releasing the armature to the action of its spring, 24, which will draw the armature from the upright position shown by solid lines to the inclined position indicated by dotted lines in Fig. 1, unless the magnet is energized, in which case the force of the magnet will be sufficient to retain the armature in upright position against the force of the spring 24.

In the path of the armature are a pair of contact-plates, 29 and 30, with which are connected the respective terminals of circuit wires, 31, of an ordinary electro-magnetic bell or signal, not shown. The contact-plate, 30, is resilient and is adapted to be forced by the movement of the armature, induced by its spring, 24, into engagement with the contact-plate, 29, to close the circuit of which said contact-plates form the terminals.

The lever, 25, is made of conducting material and its shorter end lies directly beneath and adjacent to a pair of contact-plates, 32, with which are connected the circuit-wires, 33, of an ordinary electro-magnetic bell or signal, not shown, preferably such as is adapted for fire-alarm signal purposes.

Fixed upon the lever, 25, is a finger, 34, located in the path of a crank-extension, 35, of the lever, 11, of the pole-changing switch, and so arranged that when the pole-changing switch is operated to reverse the current, as above described, the engagement of the crank-offset, 35, with said finger, 34, will force the lever, 25, from the position shown by solid lines to that indicated by dotted lines in Fig. 1.

The operation of the device is as follows:—The parts being in the position shown by solid lines in Fig. 1, and it being desired to send an alarm signal, the signal-switch, 3, is closed, thereby energizing the magnet, 2, which draws toward it the armature, 22, which movement of the armature is sufficient to withdraw the ledge, 27, from beneath the end of the lever, 25, permitting the long end of said lever to drop whereby its short end is forced upwardly against the contact-fingers, 32, thereby closing the circuit formed in part by the wires, 33, and causing the alarm signal to be sounded.

To test the system, the parts being in the position shown by solid lines in Fig. 1, the pole-changing switch is reversed, which operation reverses the current, causing the current, if the system is in working order, to pass through the cell, 21, and energize the magnet, 2, and at the same time by engagement of the crank-offset, 35, with the finger, 34, raises the lever, 25, out of the path of the finger, 28, on the armature, whereupon the armature will be retained upright by the force of the magnet 2.

Should there for any cause be a break in the circuit with which the magnet, 2, is connected, the magnet would not be thus energized when the current was reversed by reversing the pole-changing switch, and in that event the armature, as soon as released by the lever, 25, would be drawn by its spring, 24, to inclined position forcing the contact, 30, into engagement with the contact, 29, thereby closing the circuit with which the wires, 31, are connected and causing the defective-test signal to be given. It is thus possible, at any time, by reversing the pole-changing switch to ascertain whether or not the system is in proper working order.

The crank-extension, 35, may be made as long as necessary to adapt it for use with as many sets of testing devices as may be desired.

What I claim as new and desire to secure by Letters Patent is

1. In an electric signaling and testing system, and in combination, an electro-magnet; means for supplying to said electro-magnet at certain times a signaling current and at certain other times a testing current; a pair of automatically movable circuit-closing members, each normally located in the circuit-closing path of, and held out of circuit-closing position by, the other, one forming the armature of said electro-magnet and, when released by the other when said electro-magnet is deënergized, automatically movable to circuit-closing position, and movable, by energization of said electro-magnet, out of the circuit-closing path of the other member, said other member being, when released, automatically movable to circuit-closing position; and means for moving said other member out of the path of said armature-member.

2. In an electric signaling and testing system, and in combination, a source of electrical energy; an electrolytic cell resistant to the passage of an electric current in one direction, and non-resistant to the passage of an electric current in the opposite direction; an electro-magnet; conductors normally connecting said cell, electro-magnet and source of electrical energy in circuit, with said cell resistant to the passage of the electric current therethrough; a normally open signal-switch adapted to connect together said conductors on opposite sides of said cell; a pole-changing switch for said circuit; a pair of automatically movable members each normally forming a stop for the other, one adapted to form the armature of said electro-magnet, and when released, when said electro-magnet is deënergized, to close an electric signal circuit, and to be moved by energization of said electro-magnet to release the other member, said other member being adapted, when released, to close an electric signal circuit; and connections whereby, simultaneously with the reversing of said pole-changing switch, said other member is moved to release said armature-member.

3. In an electric signaling and testing system, and in combination, an electro-magnet; an armature adapted, when released, when said electro-magnet is deënergized, to close an electric signal circuit; a removable stop whereby said armature is held adjacent to said magnet; switch-mechanism whereby a testing current can be supplied to the circuit of which the electro-magnet forms a part; and means whereby the removal of said stop is accomplished by the operation of said switch-mechanism.

In testimony whereof, I have hereunto set my hand this 16th day of June, 1906.

JOHN DORAN, Jr.

Witnesses:
JOHN J. HOGAN,
E. D. BURNS.